UNITED STATES PATENT OFFICE.

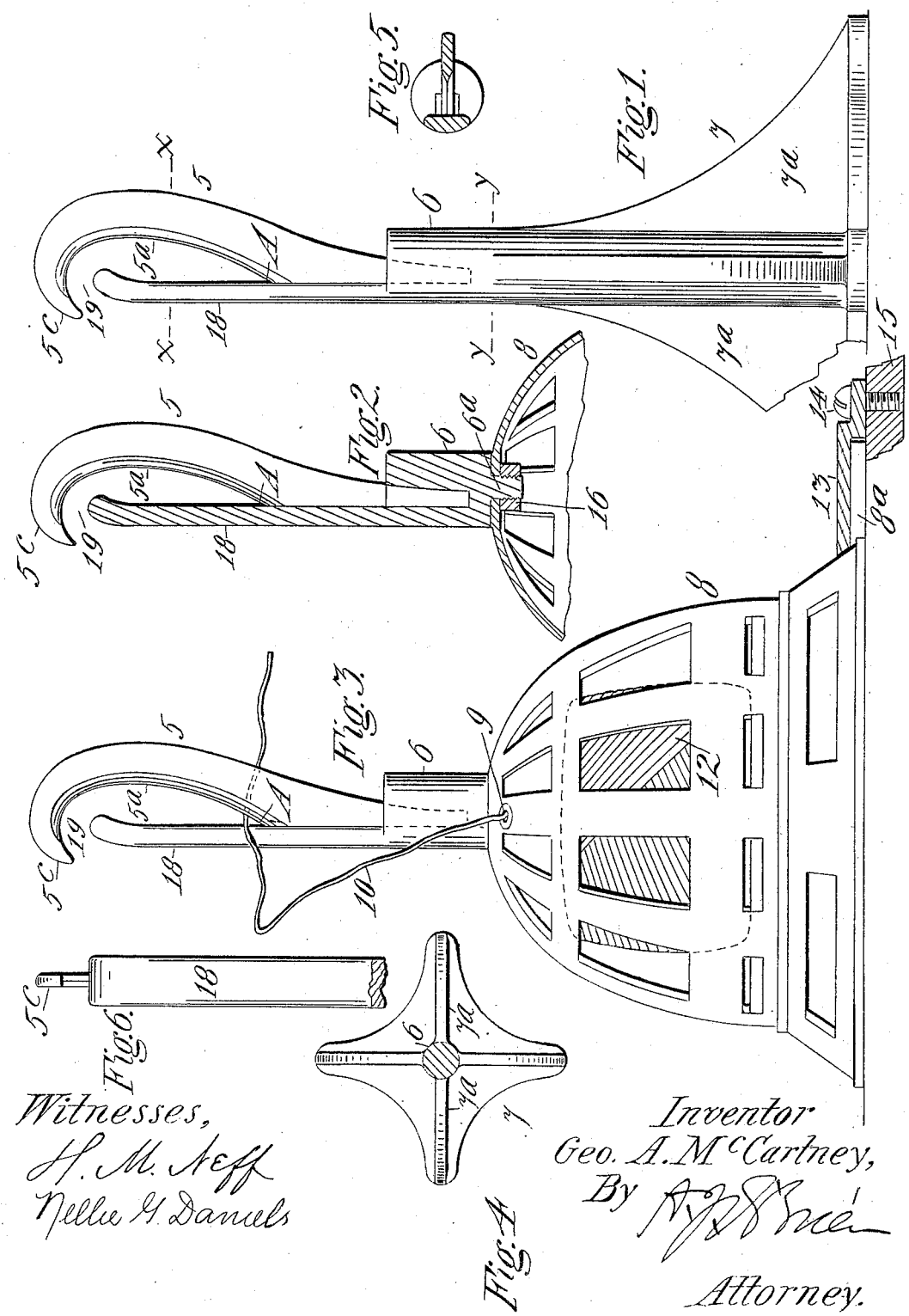

GEORGE A. McCARTNEY, OF DENVER, COLORADO.

TWINE-CUTTER.

SPECIFICATION forming part of Letters Patent No. 645,043, dated March 6, 1900.

Application filed June 27, 1899. Serial No. 722,052. (No model.)

*To all whom it may concern:*

Be it known that I, GEORGE A. MCCARTNEY, a citizen of the United States of America, residing at Denver, in the county of Arapahoe and State of Colorado, have invented certain new and useful Improvements in Twine-Cutters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in twine-cutters; and it consists of the features hereinafter described and claimed, all of which will be fully understood by reference to the accompanying drawings, in which is illustrated an embodiment thereof.

In the drawings, Figure 1 is a side elevation of my improved device, the base being partly broken away. Fig. 2 is a fragmentary section taken through the same, the blade-holder and guard being detachably connected with a twine-ball holder or basket. Fig. 3 is a side elevation of another form of construction. Fig. 4 is a section taken on the line Y Y, Fig. 1, shown on a smaller scale. Fig. 5 is a section taken on the line X X, Fig. 1. Fig. 6 is a fragmentary front view of the device.

Similar reference characters indicating corresponding parts in the views, let the numeral 5 designate a curved blade provided with a shank $5^a$, adapted to fit into a socket formed in a supporting-column 6, mounted upon a suitable base. In Fig. 1 the part 6 is formed integral with a base 7, provided with webs $7^a$, which give the device a sufficiently-stable support. As shown in Fig. 3, the part 6 is formed integral with a basket or twine-ball holder 8, which is for the most part of ordinary construction. It is provided with an orifice 9, through which the cord 10 is drawn from the twine-ball 12, placed within the basket. The base of the basket is provided with a projection $8^a$, adapted to slip under an angle-plate 13, secured to the counter or other suitable stationary support 15 by screws 14. In the construction shown in Fig. 2 the part 6 is provided with a stud $6^a$, which passes through an aperture formed in the top of a ball-basket 8, being secured by a nut 16, applied to its interiorly-protruding portion, which is threaded for the purpose. The part 6 may thus be attached or detached at pleasure. This part 6 is provided with an upright arm 18, preferably formed integral therewith. This arm is located in front of the knife-edge $5^d$ and forms a guard or shield to prevent the dulling of the edge by contact with surrounding objects and also prevents accidental injury to persons using or working around the device, which is supposed to be mounted upon a counter or other support conveniently located. This arm 18 terminates a short distance below the curved upper part $5^c$ of the knife-blade, leaving a space 19 for the entrance of the twine, cord, rope, or other thing to be cut or severed by its cutting edge. The lower portion of the knife-edge terminates at a point A in contact with the inner surface of the guard-arm. From this point the shank of the knife is provided with a vertical face, extending downward in close contact with the said arm, preventing the twine from passing between the arm and the knife-shank.

While my improved device is specially intended for a twine-cutter for use on merchants' counters, it is evident that its use is not limited thereto and that it may be employed in many other relations. It must also be understood that I do not limit the invention to the details of construction herein shown, as I am aware that many modifications may be employed without departing from the spirit of the invention.

Having thus described my invention, what I claim is—

1. A twine-cutter comprising a suitable support, an upwardly-projecting knife, and a guard or shield located in front of the knife-edge, but terminating below the upper extremity of the knife, which curves above the guard, leaving a twine-entering space between the top of the guard and the curved point of the knife.

2. In a device of the class described, the combination with a suitable supporting base or column, of an upright knife provided with a shank, adapted to fit into a socket formed in the support, and a suitable guard, located in front of the knife-edge, for the purpose set forth.

3. The combination of a suitable base provided with an upright projection or column, having a socket, a knife provided with a shank adapted to fit into said socket, and a guard-arm projecting upward in front of the knife-edge.

4. The combination with a suitable supporting-base, of an upwardly-projecting part detachably connected with said base, and provided with a socket, a knife-blade having a shank adapted to fit into said socket, and a guard-arm extending upwardly from the said socket part.

In testimony whereof I affix my signature in presence of two witnesses.

GEORGE A. McCARTNEY.

Witnesses:
EDWARD H. RANDELL,
A. J. O'BRIEN.